United States Patent Office 3,388,140
Patented June 11, 1968

---

3,388,140
CARBOXYLIC ACID ESTERS DERIVED
FROM AZIRIDINES
Morris B. Berenbaum, Levittown, Pa., and Louis Citarel,
Trenton, N.J., assignors to Thiokol Chemical Corporation, Bristol, Pa., a corporation of Delaware
No Drawing. Continuation of application Ser. No.
269,787, Apr. 1, 1963. This application Aug. 25,
1967, Ser. No. 663,934
11 Claims. (Cl. 260—402.5)

This application is a continuation of Ser. No. 269,787 filed Apr. 1, 1963, now abandoned.

The present invention relates to novel aziridine compounds and to mercaptan terminated materials and intermediates made therefrom.

An object of the present invention is to provide a novel class of aziridine compounds.

Another object of the present invention is to provide a novel class of aziridine compounds which may be used to prepare mercaptan terminated materials.

The novel aziridine compounds of the present invention have the structure

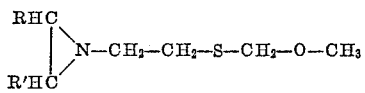

in which R and R' may each be H or $CH_3$. These aziridine compounds may be formed according to the present invention by reacting an imine such as ethylene imine or propylene imine with methoxy methyl vinyl sulfide in the presence of, as a catalyst, metallic sodium. This reaction is as follows:

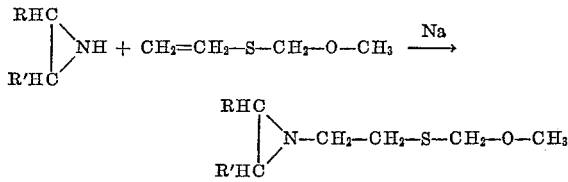

in which R and R' are as defined above.

The temperature of the reaction should be maintained relatively low, i.e., at 50° C. or lower to avoid the occurrence of side reactions. Air and moisture should be excluded from the reaction system as much as possible to avoid contaminating the sodium catalyst and thereby lower the yields that might otherwise be obtained. The reaction is usually conducted in the absence of a solvent.

The novel aziridine compounds react with carboxyl groups as follows:

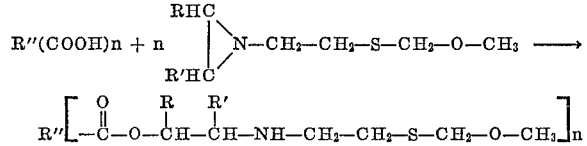

in which R" is the nucleus of the organic acid, R and R' are as defined above and $n$ is the carboxyl functionality of the acid and is a whole number of at least 1. The organic acid should be as anhydrous as possible and should not contain any groups which are more reactive with the aziridinyl group than the carboxyl group(s). This reaction of the aziridine compound with the carboxyl group containing compounds can be conducted with or without a solvent and without a catalyst. The solvents which may be used include benzene. Organic acids which may be used include saturated and unsaturated, aliphatic and aromatic, monofunctional and polyfunctional acids such as acetic acid, n-caprylic acid, 9-decylenic acid, succinic acid, azelaic acid, acrylic acid, methacrylic acid, vinyl acetic acid, itaconic acid, benzoic acid and terephthalic acid. The use of polyfunctional acids and acids containing a vinyl group are preferred since such acids, when formed into mercaptan terminated derivatives, as defined herein, may be readily used in polymerization reactions. The polyfunctional acids can be transformed, as described herein, into polyfunctional mercaptan terminated materials which can be readily polymerized. The acids containing a vinyl group may be used to introduce curable mercaptan groups into acrylate polymers to make such polymers more readily curable.

The aziridine compound/carboxyl group containing compound reaction product can be readily hydrolyzed under mild dilute acid conditions to produce mercaptan terminated materials, i.e.,

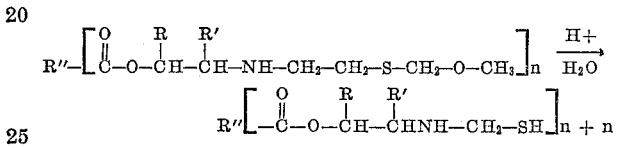

$CH_2O + nCH_3OH$ in which $n$, R, R' and R" are as defined above. Where a polycarboxylic acid is used to react with the aziridine compounds of the present invention and the resulting product is hydrolyzed as discussed above a polyfunctional mercaptan terminated product is obtained which can be readily polymerized with catalysts such as lead peroxide which are known for initiating mercaptan cures. The resulting cured polymers are useful in sealants and caulking compositions.

The following examples are merely illustrative of the present invention and are not intended as a limitation upon the scope thereof.

Example 1

To a 250 ml. flask equipped with a stirrer, thermometer, condenser and addition funnel was added 25.8 grams of ethylene imine and 0.5 gram of sodium. Dropwise, at a rate to maintain 50±5° C. without external cooling, there was then added to the flask 52 grams of methyl methoxy vinyl sulfide over about 1½ hours. An additional 0.5 gram of sodium was added and the system was stirred continuously for about 2 hours at which time a brown solid formed and it was filtered off. The filtrate was distilled and about 4 ml. of unreacted ethylene imine was collected. 43.7 grams of product, β-aziridinyl amine ethyl methoxy methyl sulfide, was collected having the following analysis: B.P. 54–57° C. at 2 mm., $n_D^{22}$ 1.4859 and $d_4^{22}$ 1.045. The product was a water white, water soluble, mobile liquid which gave a positive reaction for nitrogen and sulfur in sodium fusion tests. The product had the structure

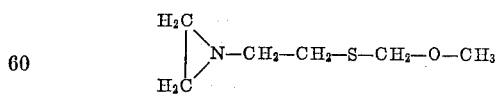

A water solution of the material reacts with hydrochloric acid gently for imine polymerization and then gives positive Rheinhold Test. Analysis showed:

Actual: N, 9.35%; S, 21.29%. Theoretical: N, 9.53%; S, 21.75%.

The propylene imine derivative can be readily formed by substituting propylene imine for ethylene imine in the above procedure.

Example 2

To a 50 ml. Bantam ware resin pot equipped as in Example 1 was added 17.7 grams of ethylene imine and 0.5 gram of sodium. Dropwise, at a rate to maintain $50\pm5°$ C. without external cooling, there was then added to the reaction system 36.0 grams of methoxyl methyl vinyl sulfide in about 2 hours. An additional 0.5 gram of sodium was added during the addition period and gentle heating with warm water was used during the last ½ hour of the reaction period. The mixture was distilled at 50°–50.5° C. at 1.5 mm. and 14.0 grams was collected of β-aziridinyl amine ethyl methoxy methyl sulfide, a water white oil; $n_D^{28}=1.4833$.

Example 3

29.4 grams of aziridine compound prepared as in Example 1 or 2 was added dropwise over a period of 1 hour to a solution of 12 grams of glacial acetic acid in 100 ml. of benzene. The temperature of the reaction rose to 32° C. and remained at that temperature while the reaction was stirred for an additional hour. The mixture was finally refluxed for an additional 2 hours. After the removal of the solvent and unreacted materials, 34.2 grams (78%) of the crude product was obtained. The product was distilled under high vacuum, B.P. 130° C. at 0.01 mm., $N_D^{22}=1.5095$, $d_4^{22}=1.182$, $M_r$ 54.16, theor. 52.36. Anal. calcd. N, 6.76; S, 15.45. Found N, 6.82; S, 16.07. The product has the structure:

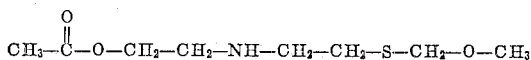

Upon hydrolysis with a dilute acid, such as HCl or $H_2SO_4$, the compound prepared above is readily hydrolyzed to a compound having the structure:

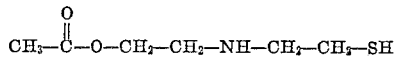

Example 4

To a solution of 7.0 grams of n-caprylic acid in 50 ml. of benzene there was slowly added over a period of about 10 minutes, 7.35 grams of β-aziridinyl amine ethyl methoxy methyl sulfide prepared as in Example 1 or 2. A gentle exotherm arose to produce a maximum temperature, without external cooling, of about 50° C. The exotherm abated about 10 minutes after the completion of the addition of the aziridine compound. The solution was then refluxed on a steam bath for about 30 minutes and then allowed to stand overnight at room temperature. The reaction system was then dissolved in 50 ml. of ethyl ether and washed several (at least four) times with 20 ml. of distilled $H_2O$ each time. The second $H_2O$ wash contained 3 pellets to NaOH to neutralize unreacted acid. The ether phase was washed until a neutral (to litmus) wash was obtained. The ether phase was then dried with magnesium sulfate and then evaporated to constant weight (7.6 grams). The product was a clear, slightly amber colored, slightly viscous oil which had the structure:

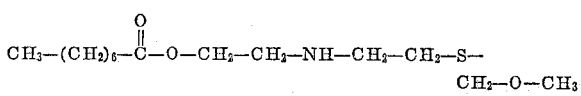

The product gave a positive Rheinhold test reaction and a +N and +S Fusion test reaction. It had a refractive index of $n_D^{25}$ 1.4902.

*Analysis.*—Theoretical: N, 4.82 percent; S, 11.0 percent. Found: N, 5.19 percent; S, 11.7 percent.

Upon hydrolysis with a dilute acid such as sulfuric or hydrocholoric acid, the compound prepared above is readily hydrolyzed to a compound having the structure:

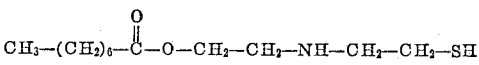

Example 5

To a solution of 10.1 grams of the monomethyl ester of azelaic acid in 50 ml. of benzene there was slowly added over a period of about 10 minutes 7.35 grams of β-aziridinyl amine ethyl methoxy methyl sulfide produced as in Example 1 or 2. A gentle exotherm arose to produce a maximum temperature, without external cooling, of about 65° C. The exotherm abated about 30 minutes after the completion of the addition of the aziridine compound. The solution was then refluxed on a steam bath for about 30 minutes and then allowed to stand overnight at room temperature. The reaction system was then dissolved in 50 ml. of ethyl ether and washed several times (at least four) with 20 ml. of distilled water each time. The second $H_2O$ wash contained 3 pellets of NaOH to neutralize unreacted acid. The ether phase was washed until a neutral (to litmus) was obtained. The ether phase was then dried with magnesium sulfate and then evaporated to constant weight (9.5 grams). The product was a clear, slightly amber colored, slightly viscous oil which had the structure:

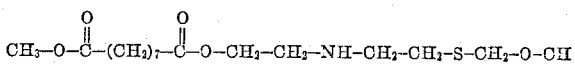

The product gave a position Rheinhold test reaction and a +N and +S Fusion test reaction. It had a refractive index of $n_D^{25}$ 1.4912.

*Analysis.*—Theoretical: N, 4.01 percent; S, 9.17 percent. Found: N. 5.19 percent; S, 11.7 percent.

Upon hydrolysis with a dilute acid such as sulfuric or hydrochloric acid, the compound prepared above is readily hydrolyzed to a compound having the structure:

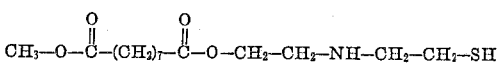

We claim:

1. A compound having the structure

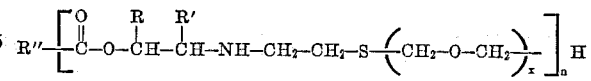

wherein R″ is the nucleus of a hydrocarbon carboxylic acid,
R and R′ are selected from the group consisting of H and $CH_3$,
x is 0 or 1, and
n is the numerical functionality of said carboxylic acid.

2. A compound as in claim 1 wherein R″ is the nucleus of a carboxylic acid selected from the group consisting of acetic acid, n-caprylic acid, 9-decylenic acid, succinic acid, azelaic, the monomethyl ester of azelaic acid, acrylic acid, methacrylic acid, vinyl acetic acid, itaconic acid, benzoic acid and terephthalic acid.

3. A compound as in claim 2 wherein R″ is $CH_3$ and n is 1.

4. A compound as in claim 3 having the structure

5. A compound as in claim 3 having the structure

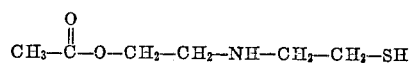

6. A compound as in claim 2 wherein R″ is

and n is 1.

7. A compound as in claim 6 having the structure
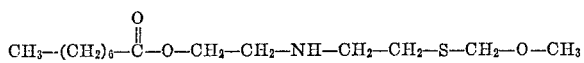
8. A compound as in claim 6 having the structure
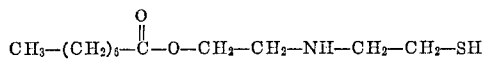
9. A compound as in claim 2 wherein R′ is
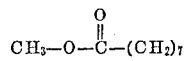
and n is 1.
10. A compound as in claim 9 having the structure
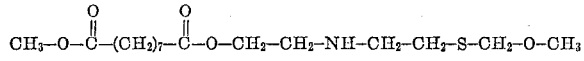
11. A compound as in claim 9 having the structure
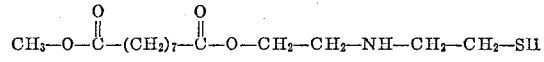
References Cited
UNITED STATES PATENTS
3,142,675 7/1964 Rai et al.
3,221,013 11/1965 Fields et al.
LORRAINE A. WEINBERGER, *Primary Examiner.*
V. GARNER, *Assistant Examiner.*

UNITED STATES PATENT OFFICE
CERTIFICATE OF CORRECTION

Patent No. 3,388,140                             June 11, 1968

Morris B. Berenbaum et al.

It is hereby certified that error appears in the above numbered patent requiring correction and that the said Letters Patent should read as corrected below.

Column 4, lines 27 to 29, the formula should appear as shown below:

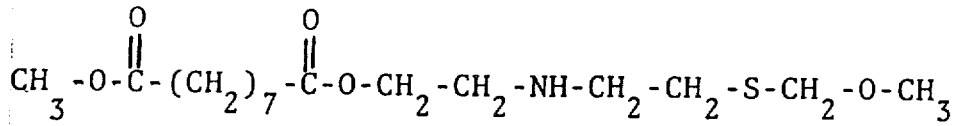

line 34, "Found: N. 5.19 percent; S, 11.7 percent" should read -- Found: N, 4.24 percent; S, 9.56 percent --; line 57, "azelaic", first occurrence, should read -- azelaic acid --. Column 5, line 11, "wherein R' is" should read -- wherein R" is --.

Signed and sealed this 21st day of October 1969.

(SEAL)
Attest:

EDWARD M. FLETCHER, JR.                     WILLIAM E. SCHUYLER, JR.
Attesting Officer                             Commissioner of Patents